April 28, 1931. C. A. MARIEN 1,802,566
PISTON RING
Filed Sept. 13, 1930
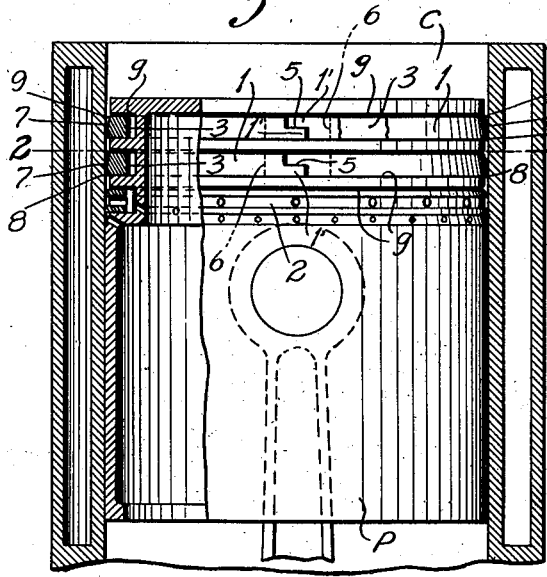
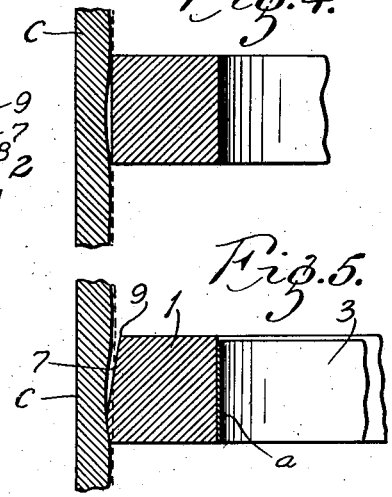
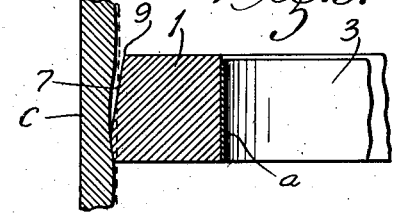
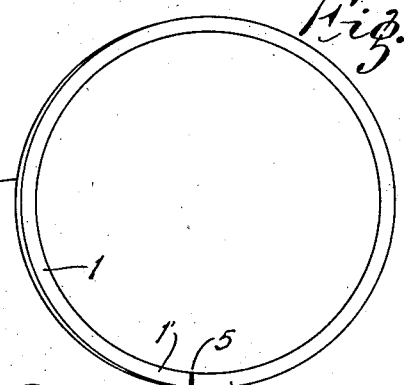
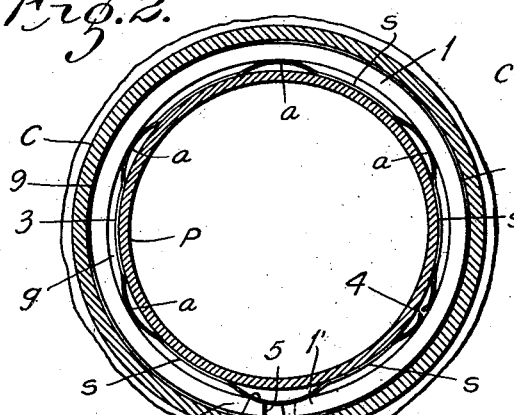
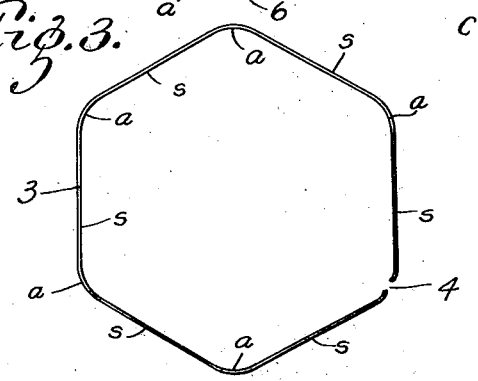
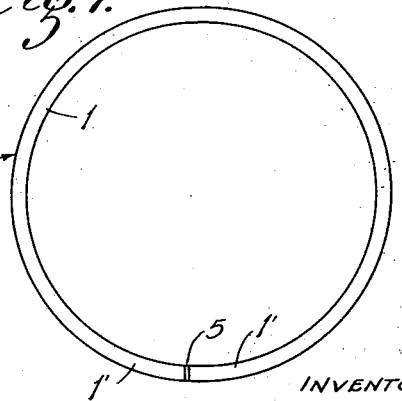
INVENTOR:
CHARLES A. MARIEN.
By Harry A. Dimmer
ATTORNEY.

Patented Apr. 28, 1931

1,802,566

UNITED STATES PATENT OFFICE

CHARLES A. MARIEN, OF ST. LOUIS, MISSOURI, ASSIGNOR TO RAMSEY ACCESSORIES MFG. CORPORATION, OF ST. LOUIS, MISSOURI, A CORPORATION OF MISSOURI

PISTON RING

Application filed September 13, 1930. Serial No. 481,720.

My invention has relation to improvements in piston packing rings for internal combustion engines, and it consists in the novel features of construction more fully set forth in the specification and pointed out in the claim.

The present invention is directed more particularly to compound rings, i. e. an outer ring with an expander ring behind it, the combination also being called an expander type ring.

The object of the present invention, aside from the prevention of oil pumping by the piston and loss of compression, is to provide a piston ring that is durable and that will function efficiently for many thousands of miles of motor operation. Since the advent of high speed, high compression motors, the oil pumping evil has greatly increased and rings that were serviceable in engines of slower speed and lower compression are no longer adequate. Many types of rings have been designed to overcome compression loss and oil pumping, and considerable progress has been made, but, as yet, the effective life of such rings now in use is much too short.

I have provided a ring combining features that will enable the ring to "wear in" quickly, and one that will fit snugly against the cylinder wall even though this wall is worn out of true. The ring is also held against rotation in the ring groove so that when once worn to the shape of the cylinder it does not assume a different position which requires the "wearing in" operation to begin anew.

Further and other advantages will be better apparent from a detailed description of the invention in connection with the accompanying drawings, in which—

Fig. 1 is a combined side elevation and vertical section through a conventional piston showing my improved rings disposed in the ring grooves; Fig. 2 is a horizontal cross-section through the piston taken on the line 2—2 of Fig. 1; Fig. 3 is a side view of the spring expander before being compressed into the ring groove; Fig. 4 is a diagrammatic view illustrating a worn cylinder (exaggerated for the sake of clearness) the old type square faced ring in contact therewith; Fig. 5 is a view similar to Fig. 4 with my improved ring in contact therewith; Fig. 6 is a diagrammatic view showing how oil leaks past the ordinary ring in an out-of-round cylinder; and Fig. 7 is a similar view showing how my improved ring hugs the wall of an out-of-round cylinder to close the leakage space shown in Figs. 4 and 6.

Referring to the drawings, P represents a piston adapted for operation in an engine cylinder C, said piston being provided with the customary ring grooves $g, g, g$ for holding piston rings 1, 1, and 2. The upper rings 1, 1 are compression rings and form the subject of the present application, while ring 2 is an oil ring and is described in a separate application for Letters Patent. The ring 1 is of the type having comparatively little inherent tension. In other words, it is flexible but comparatively inert and if placed in the groove $g$ alone, would not bear against the wall of cylinder C with sufficient pressure to hold compression and is generally known as a "dead" ring. Therefore, an expander, or spring ring 3, is provided for insertion in groove $g$ behind the ring 1 to force the ring outwardly against the cylinder wall.

This expander is formed in the shape of a regular polygon having its sides $s, s$ etc. connected by arcuate portions $a, a$ etc. The expander is split at 4 to permit its being placed into the groove $g$, and also to allow it to contract under the pressure to which it is subjected in the groove (Fig. 2).

The abutting ends 1', 1' of the ring are cut to form a step joint 5, (although a mitered or straight joint may be used) and the inside surface of each end 1' is cut in so that a notch 6 is formed when the ends 1', 1' are together (Figs. 1 and 2). In assembling the ring 1 and the expander 3 in the ring groove $g$ they are so positioned relative to each other that an arcuate portion, or corner, $a$ rests in the notch 6. This locks the ring and expander together, thus preventing rotation of the ring in the groove $g$ during the operation of piston P. The frictional engagement of the sides $s$ (which hug the bottom of groove $g$) with the piston holds the expander in place, and the expander holds the ring in place.

This is clearly shown in Fig. 2. The advantage of thus holding the ring in a definite place relative to the piston is that it will quickly wear to fit irregularities in the cylinder and it will continue to operate in the position in which it has been worn to fit. If a badly out-of-round cylinder is fitted with new rings which may rotate after having been worn in, all the advantage of wearing the ring to the cylinder is destroyed as they are likely to be worn down where the metal is needed and an oil or compression leak results.

The nesting of the arcuate portion $a$ of the expander in the notch 6 also serves as a seal over the joint 5, and prevents blow-by through the joint with loss of compression. There is still another advantage of the notch at the ring joint and that is the relieving of the pressure at the joint exerted by the expander so that this pressure is not excessive at the ends 1', 1'.

It will be observed that the outer face 7 of the ring 1 is beveled, or tapered, so that the ring is larger in diameter at its lower edge 8 than at its upper edge 9. Thus, only a very limited surface is presented to the cylinder wall when the ring is inserted with the result that the ring will seat itself against the wall more quickly than if the face of the ring were square. This beveled face operating in conjunction with the expander (which forces the ring against the cylinder wall with uniform pressure at equally spaced points throughout its entire circumference) enables the ring to fit snugly throughout its entire circumference even in cylinders that are considerably out-of-round because of wear or heat distortion. If the tapered face were applied to a ring operating without an expander, full advantage of the taper would not be obtained because of the unequal pressure at various points in the ring circumference.

Thus in an ordinary "snap" ring, i. e., one in which the tension is in the packing ring itself, there will be about 2 lbs. pressure at the ends adjacent to the gap, and 8 lbs. pressure at right angles thereto. Then, as the lower (scraping) edge wears down the pressure of ring against cylinder is reduced because the ring becomes smaller, and the ring will soon fail to function either as a compression or oil seal. As the wear continues the bearing pressure against the cylinder decreases until the ring is merely lying against the cylinder wall. Thus with a "snap" ring a tapered face is really a detriment because it merely speeds up the wear and hastens the failure of the ring.

However, when a "dead" ring associated with an expander is provided with a tapered, or inclined working face, the "wearing-in" of the tapered face does not appreciably reduce the bearing pressure of ring against cylinder because the greater latitude of expansion of the expander continues to force the ring in contact with the cylinder wall with sufficient pressure to maintain the seal. This greater latitude of expansion of the combination "dead" ring and expander also has the great advantage over the "snap" ring that fewer stock sizes are necessary to service any given size of piston. For instance, a standard combination "dead" ring and expander may be used for cylinders up to .015" oversize, while five sizes of "snap" rings are necessary to cover this range. And three oversize combination "dead" rings with expanders cover the oversize range from .015" to .060", while nine oversize "snap" rings are necessary to cover this range. This, of course, makes for economy, simplicity in servicing, and a smaller expenditure of money by the jobber who handles a complete set of sizes.

Of course, the pressure of the expander against the ring will be somewhat greater at the points $a$ (Fig. 2) than between these points when the ring and expander are first placed in the piston; but the ring quickly wears down at these points because of its tapered working face and almost immediately relieves this excessive pressure so that the pressure entirely around the ring is soon equalized.

Having described my invention, I claim:

A piston packing ring comprising in combination an outer inert flexible ring element having a face uniformly tapered from the top to the bottom edge thereof, and an inner tension element cooperating therewith, said inner element being adapted to exert practically uniform radial pressure outwardly throughout the circumference of the outer element.

In testimony whereof I hereunto affix my signature.

CHARLES A. MARIEN.